United States Patent [19]
Crockett

[11] Patent Number: 5,590,188
[45] Date of Patent: Dec. 31, 1996

[54] RULES-BASED CALL ROUTING

[75] Inventor: Gary B. Crockett, Plano, Tex.

[73] Assignee: IEX Corporation, Richardson, Tex.

[21] Appl. No.: 390,934

[22] Filed: Feb. 17, 1995

Related U.S. Application Data

[63] Continuation of Ser. No. 973,034, Nov. 9, 1992, abandoned.

[51] Int. Cl.⁶ ................................................ H04M 7/00
[52] U.S. Cl. ........................ 379/225; 379/207; 379/265; 379/266; 379/221
[58] Field of Search .................. 379/225, 221, 379/265, 266, 210, 211, 212, 213, 214, 201, 207

[56] References Cited

U.S. PATENT DOCUMENTS

| | | | |
|---|---|---|---|
| 4,400,587 | 8/1983 | Taylor et al. | 379/266 |
| 4,694,483 | 9/1987 | Cheung | 379/265 |
| 4,737,983 | 4/1988 | Frauenthal et al. | 379/265 |
| 4,953,204 | 8/1990 | Cuschleg, Jr. et al. | 379/266 |
| 5,029,196 | 7/1991 | Morganstein | 379/214 |
| 5,452,350 | 9/1995 | Reynolds et al. | 379/265 |

*Primary Examiner*—Ahmad F. Matar
*Attorney, Agent, or Firm*—David H. Judson

[57] ABSTRACT

A method, using a call processor, for selecting one of a plurality of call centers in a telephone network. The method begins by generating a routing plan comprising one or more rules that control how calls are to be distributed among the call centers. For each call to be distributed, the rules in the routing plan are executed for a set of valid call center destinations until a destination for the call has been selected or until all rules have been executed. If all rules have been executed and more than one call center is still a valid destination for the call, the remaining call center destinations are then further evaluated according to the rules to select a destination for the call.

7 Claims, 2 Drawing Sheets

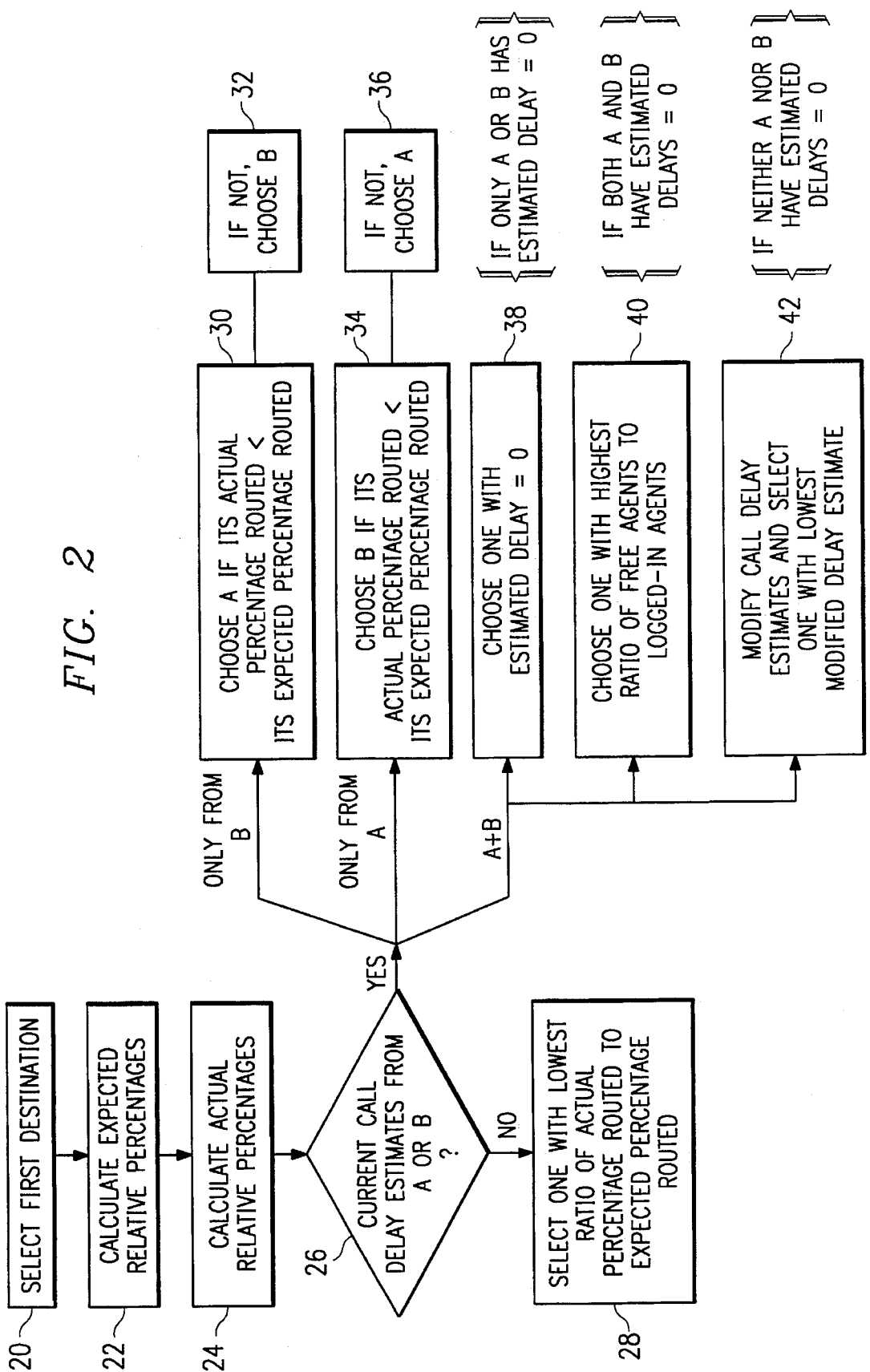

5,590,188

1

RULES-BASED CALL ROUTING

This is a continuation of application Ser. No. 07/973,034 filed on Nov. 9, 1992 (now abandoned).

TECHNICAL FIELD

The present invention relates generally to telecommunications and more particularly to a method for distributing telephone calls or other messages among multiple possible destinations.

BACKGROUND OF THE INVENTION

Telephone call centers that handle calls to toll-free "800" numbers are well-known in the art. Typically, a company may have many call centers, all answering calls made to the same set of 800 numbers. Each of the company's call centers usually has an automatic call distributor (ACD) or similar equipment capable of queuing calls. ACD management information systems keep statistics on agent and call status, and can report these statistics on frequent intervals. Such capabilities are in use today for centralized reporting and display of multi-location call center status.

In such systems, the company will want to distribute the calls to its call centers in a way that will optimally meet its business goals. Those goals might include low cost of call handling, answering most calls within a given amount of time, providing customized handling for certain calls, and many others. It is also known in the prior art that certain call routing criteria and techniques support a broad range of business goals. These include "load balancing," "caller segmentation" and "geographic routing." Load balancing refers to distribution of calls so that the expected answer delay for new calls is similar across all the call centers. If other considerations do not dictate otherwise, load balancing is desirable because it provides optimum efficiency in the use of agents and facilities, and it provides the most consistent grade of service to callers. In special situations it might be desirable to unbalance the load in a particular way, but control over the distribution of call load is still desired.

If the caller's identity can be inferred from the calling number, caller-entered digits, or other information, that identity may influence the choice of destination for the call. Call routing based on such information is referred to as caller segmentation. Also, it has been found desirable for particular call centers to handle calls from particular geographic areas. The motivation may be to minimize call transport costs, to support pre-defined call center "territories", or to take advantage of agents specifically trained to handle calls from given locations. Such techniques are known as geographic routing.

The interexchange carriers who provide 800 service today generally support some form of "routing plan" to help achieve load balancing, caller segmentation and geographic routing. Typically these routing plans allow 800 call routing based on time of day, day of week, the caller's area code, caller-entered digits, and fixed percentage allocations. Predominately, however, the routing plans supported by the carriers are static in the sense that they do not automatically react to unexpected variations in incoming call volume or distribution, nor to actual call delays being experienced at each destination. Reaction to changing conditions is done via manual modification of the plan, on a time scale of minutes or hours.

2

Recent service offerings from some interexchange carriers offer some degree of automatic reaction to changing conditions. One such offering, called "alternate termination sequence" or "ATS" (from AT&T), allows customers to establish maximum numbers of calls to be queued for each destination, with a pre-defined alternative when a primary destination is overloaded. Another offering, referred to as "intelligent routing control" or "IRC" (from MCI), allows an ACD to refuse a call from the network, again resulting in pre-defined alternative call handling. A third kind of service, AT&T's Intelligent Call Processing, lets the interexchange network pass call-by-call data to a computer.

While these service offerings offer certain advantages over more conventional call routing, they have significant deficiencies. Such offerings do not provide for complex routing schemes based on comparative delay times, call center service level commitments or other similar considerations. These systems do not offer the user the opportunity in a straightforward way to create rules that define constraints and/or preferences for determining individual call routing. Many do not function effectively in case of data outages from one or more destinations. Such prior art systems are incapable of anticipating changes in staffing and redistributing load in anticipation of such changes. These systems are also prone to user errors and are difficult to use.

There has therefore been a long-felt need in the telephone call routing art to overcome these and other deficiencies of the prior art and to provide an efficient rules-based call routing scheme that can be implemented throughout the telephone network.

BRIEF SUMMARY OF THE INVENTION

It is an object of the present invention to provide a method for distributing telephone calls or other messages among multiple possible destinations.

It is a further object of the invention to provide such a call distribution method using a novel decision procedure for determining the routing of an individual call and one or more rules that enable users to describe constraints and preferences for the decision procedure.

It is another object of the invention then to provide a rules-based telephone call routing method that has significant advantages over prior art techniques. The decision procedure is better able to anticipate changes in staffing and to distribute load in anticipation of such changes. By using a rules-based approach according to the invention, complex routing based on delay times, call center service level commitments and other considerations are supported with fewer routing instructions.

It is yet a further object of the invention to provide improved call routing techniques wherein routing plans are shorter, less complex, less error-prone and more self-documenting as compared to prior art methods and systems.

It is another specific object of the invention to provide call routing based on multiple routing goals without requiring forecasts of incoming call characteristics.

Still another object of the invention is to implement "soft" routing preferences such as geographic routing preferences subject to limits on percentage routing imbalance. According to the invention, percentage routing or other load balancing techniques are implemented whether destinations handle calls from one or multiple telephone numbers.

It is still another object to provide such rules-based call routing in various types of telephone systems includes telephone switches supporting external call control interfaces, telephone networks supporting a call-by-call routing interface to computing equipment on customer premises, telephone networks internally using Signaling System 7 ("SS7") or other means for call routing transaction processing, and any other telephone switch or network in which the inventive method could be incorporated into new or existing software systems.

It is a more specific object of the invention to describe a rules-based call routing method which takes advantage of certain information, to the extent such information is available in the network. Such information comprises "status data," which refers to information about the current or recent status of potential call destinations, and "planning data," which refers to information about expected future changes in the status of potential call destinations. The method may be implemented whether or not status data is available from the destinations.

According to the preferred embodiment, the present invention describes a method, using a call processor, for distributing telephone calls among multiple call center destinations in a telephone network. The telephone network includes a switch connectable to the call processor and each of the multiple call center destinations for routing a call to a destination selected by the call processor. The method begins by generating a routing plan comprising one or more rules that control how calls are to be distributed among the multiple call center destinations. For each call to be distributed, the rules in the routing plan are executed for a set of valid destinations until a destination for the call has been selected or until all rules have been executed. If all rules have been executed and multiple valid destinations remain, the multiple valid destinations are then processed to select a destination for the call.

Generally, the rules include "constraints" that eliminate one or more destinations from the set of valid destinations eligible to handle the call, and "preferences" for biasing one or more call center destinations over other call center destinations. If current call center statistics are available to the call routing processor, the method optionally calculates an estimated answer delay for one or more of the call center destinations. In such case, the processing of the multiple valid destinations comprises selecting the destination having a shortest estimated answer delay after the estimated answer delays for all destinations have been modified as directed by the routing plan rules.

In certain situations, call center statistics may not be available to the call routing processor. In such case it is desirable to assign each of the call center destinations a predetermined initial target percentage of calls, which percentages may vary by day of week and time of day. In this embodiment, processing of the multiple valid destinations comprises selecting the destination having a largest deficit or smallest surplus of recently routed calls as compared to initial target percentages after the initial target percentages for all destinations have been modified as directed by the routing plan rules.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 2 is a flowchart describing the decision routine of the present invention;

Similar reference characters refer to similar parts or steps throughout the several views of the drawings.

DETAILED DESCRIPTION

The present invention describes an improved method for distributing telephone calls or other messages among multiple possible destinations. According to the invention, a novel decision procedure, described below, determines the routing of an individual call. A user of the invention creates so-called "rules" to define constraints and/or preferences that control the actions of the decision procedure. Preferably, rules are created using an English-like syntax. The mechanism for rules creation can be a standard text editor or word processing program, or it can be a specialized text processing program that enforces the syntax requirements of the rules.

Each rule generally contains a conditions portion and an actions portion. The conditions portion can reference such information as time of day, day of week, calling number information, caller-entered digits, estimated call delays (in a network ACD application) and call classifications provided in real time by cooperating applications. Straightforward extensions of existing rules can include other condition information obtained from ACD's or other external sources. Each action preferably has one of two effects. It can eliminate one or more destinations from the list of those eligible to handle the call, or it can add or subtract a "bias" value to (i) estimated answer delays at one or more destinations (where call center statistics are available to the call routing processor) or (ii) initial target routing percentages for each of the destinations (where call center statistics are not available to the call routing processor).

Figure 1:
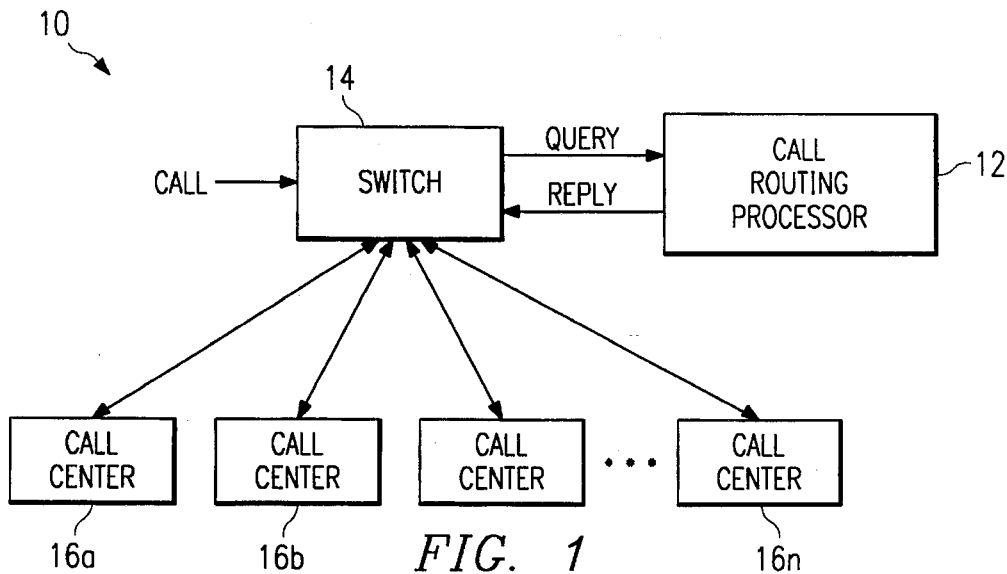
FIG. 1 is a block diagram of a telecommunications network having a switch connected between a call routing processor and multiple call centers that receive calls routed according to the teachings of the present invention.

The invention is implemented within a switching network or on separate computing equipment that communicates to the switching network via data facilities. As seen in FIG. 1, a representative telecommunications switching system or network 10 includes a logically separate call routing processor 12 on which the various software routines of the invention are supported. The call routing processor is connected to a switch 14. The switch 14 in turn is connectable to one or more call center destinations 16a. . . 16n in a conventional manner. The switch 14 is responsible for directing an incoming call to a particular destination 16. For each call received by switch 14, a query is sent from the switch to the call routing processor to determine which call center destination should receive the call. The call routing processor processes the request (based on the teachings of the present invention) and notifies the switch 14 of the result. The switch then routes the call to the selected destination.

The switch is conventional and forms no part of the present invention. Although not meant to be limiting, preferably the call routing processor is a general purpose computer running a suitable operating system. The present invention is preferably implemented in software supported on the call routing processor and is useful where the following conditions are met: (i) for each call to be routed (or for each member of a subset of calls to be directly controlled), relevant information (for example, called number, calling number, additional caller-entered digits if any) about the call can be made available by the network to the processor quickly enough to be used in deciding call routing, and (ii) the network is capable of receiving commands from the processor to direct disposition of the call. Examples of such systems which could constitute the network in the above descriptions include telephone switches supporting external call control interfaces (e.g., AT&T's Advanced Switch-Application Interface, Northern Telecom's Switch-Computer Application Interface and others), telephone networks supporting a call-by-call routing interface to computing equipment on customer premises (e.g., AT&T's Intelligent Call Processing service), telephone networks internally using Signaling System 7 or other means for call routing transaction processing, and any other telephone switch or network in which the algorithms to be described could be incorporated into new or existing software.

Besides the above basic call information and control capabilities, the call routing technique of the invention takes advantage of additional information, to the extent that it is available. This information comprises "status data" and "planning data". Status data refers to information about the current or recent status of potential call destinations; it might include, for example, data about the number of calls queued, the number of calls routed to the destination during a predetermined time interval (e.g., the last 5 minutes), the number of agents available to answer calls, and the average handling time for calls. Planning data refers to information about the "configuration" of the call centers as well as information about expected future changes in the status of potential call destinations; it might include, for example, times of day throughout the week the destination is "open" to receive calls, relative call-handling capacity by time interval and day of week (such numbers are "relative" to all other destinations for a particular customer and may be thought of as the "percentage routing" allocations for the destination), the default average handle time for calls at this destination, work schedules for agents and planned downtime for communications equipment.

The call routing decision procedure of the invention can now be described. The procedure uses a given set of compiled rules, status data (if available) from possible call destinations, and planning data (if available). The procedure is invoked when a call arrives from the network. It produces a destination for the call. The mechanism by which the network switch 14 is instructed by the call routing processor to route the call to the desired destination is dependent on the particular network's external control capabilities.

The decision procedure comprises a number of steps. Based on the number called, the method obtains a starting list of valid destinations and the previously-created routing plan data (comprising the rules). Alternatively, the routing plan itself includes a rule (having no conditions) that identifies or includes the list of valid destinations. Typically the list includes any destination mentioned in any rule of a particular rule set. The rules in the routing plan are then executed until a unique destination has been selected or until all rules have been executed. The remaining valid destinations are then processed to select the best one.

In particular, in a first embodiment of the invention it is assumed that the call routing processor has available to it current status data from the call center destinations. In this embodiment, it is desirable for the call routing processor to calculate (as will be described below) an estimated answer delay for the call center destinations. Further, one or more rules may include timing preferences (e.g., "If the call originates from the West Coast, prefer Los Angeles by ten seconds"). Because of such preferences, when the rules in the routing plan are executed, one or more of the estimated answer delays for the set of remaining valid destinations may be modified. The call routing processor then determines which of the remaining valid destinations has the shortest modified estimated answer delay. The processor then notifies the switch to send the call there.

For example, assume the set of valid destinations includes Chicago, New York and Los Angeles and that the estimated answer delay for each is 14 seconds, 15 seconds and 20 seconds, respectively. Assume further that one of the rules includes the above preference where calls originating from the West Coast are biased by 10 seconds. When this rule is executed, the estimated answer delay for Los Angeles is modified and becomes 10 seconds (because the estimated answer delay of 20 seconds is reduced by the 10 second preference). Thus an incoming call from the West Coast will be routed to Los Angeles even though Chicago technically has a shorter estimated answer delay.

The call routing processor preferably keeps track of the bias values for all valid destinations as each new call routing request is received from the switch. As each request is received, the processor sets the bias values for all valid destinations to zero. If a rule mandates a timing preference, the value is added to a running sum for the valid destination(s). The timing preference may be positive or negative. After the rules are executed, the set of modified estimated answer delays for the valid destinations is analyzed and the shortest estimated answer delay is identified. The destination with this delay is selected to receive the call.

The rules may also include special conditions such as "select" or "avoid." For example, it may be desirable to select a specific call center destination for certain types of calls requiring specialized agents. It might likewise be desirable to avoid certain call center destinations where trainee agents are located.

In another embodiment of the invention, it is assumed that the call routing processor does not have available to it current call center statistics. This may occur either because the call center do not have the capability of providing status data to the processor or because such data becomes unavailable to the processor for some reason. In such case it is desirable to assign each of the call center destinations a predetermined initial target percentage of calls, which percentages may vary by day of week and time of day. Further, one or more rules may include routing percentage preferences (e.g., "If the call originates from the West Coast, prefer Los Angeles by 2%"). Because of such preferences, when the rules in the routing plan are executed, one or more of the initial target routing percentages may be modified. The call routing processor then determines which of the remaining valid destinations is farthest from achieving its target percentage (which may have been modified by a rule) for calls routed during a predetermined recent time period. The call center with the largest deficit or smallest surplus (with respect to the target percentage) of recently routed calls is the farthest from achieving its (initial or modified) target percentage. The call routing processor then selects that call center to receive the call.

Thus according to either embodiment, after the rules are executed for each call, any remaining valid destinations are filtered through a process (which is essentially a load balancing algorithm) to select the destination. The rules function to add or subtract a "bias" value to (i) estimated answer delays at the destinations or (ii) target routing percentages for the destinations. In either case, it is possible that execution of the rules (or a portion thereof) will result in a single call center destination, in which case it becomes unnecessary to perform the further processing described above.

Rules are processed one at a time, in a fixed sequence. For each rule, the rule conditions are evaluated using status data when available, and information about the call passed from the network. If all conditions for a given rule are satisfied, the action portion of that rule is performed.

As noted above, rules are executed until all candidate destinations except one have been eliminated or until all rules have been processed. If, after all rules have been executed, more than one destination is still eligible to receive a call, then a destination selection routine is implemented. A destination selection routine for use when estimated answer delays are available is described in the flowchart of FIG. 2.

The routine begins with the selection of a destination from a list of remaining candidates. At step 20, the first destination on the list is selected provisionally. Each remaining destination is then compared with the provisional selection to see if it is superior; if so, it becomes the provisional selection. The comparison uses the following procedure. Assume "A" represents the provisional selection and "B" represents the candidate being compared. At step 22, the routine calculates the expected relative percentage of calls routed to A and B based on staffing information obtained from staff planning software or other sources. At step 24, the routine calculates the actual relative percentage of calls routed during the past 10 minutes (or other time interval) to each destination. The routine continues at step 26 to test whether there is current call delay estimate data from either A or B. If not, the routine continues at step 28 and chooses the one that has the lowest ratio of actual percentage routed to expected percentage routed.

If there is current call delay estimate data from B but not from A, the routine continues at step 30 to choose A if its actual percentage routed is less than its expected percentage of recent calls routed (as calculated in step 22); otherwise the routine continues at step 32 and chooses B. On the other hand, if there is current call delay estimate data from A but not from B, the routine continues at step 34 to choose B if its actual percentage routed is less than its expected percentage of recent calls routed (as calculated in step 22); otherwise, the routine continues at step 36 and chooses A. If there is current call delay data from both A and B, and only one has an estimated delay of zero (i.e. has currently available agents), the routine continues at step 38 to choose that one. If there are current call delay estimates from both A and B, and both destinations have an estimated delay of zero (i.e. both have agents free), the routine continues at step 40 to choose the one that has the highest ratio of free agents to logged-in agents. If there is current call delay data from both A and B, and neither has an estimated delay of zero, the routine continues at step 42 and modifies the call delay estimates for A and B by the number of bias seconds indicated by the rules that were executed and then select the one with the lowest modified delay estimate.

As noted above, each remaining destination is then compared with the provisional selection to see if it is superior; if so, it becomes the provisional selection. After all remaining destinations are processed in this manner, the last remaining provisional selection becomes the selected destination.

Figure 3:
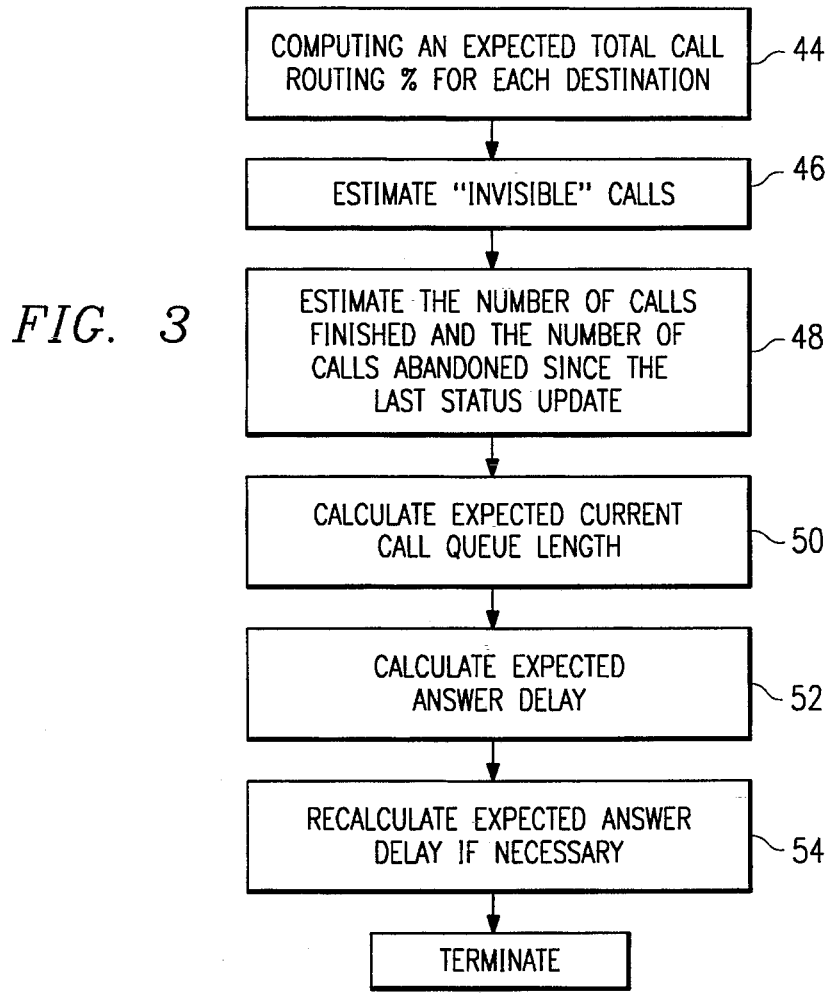
FIG. 3 is a flowchart describing the estimated delay routine of the invention.

Referring now to FIG. 3, a flowchart is described on the preferred routine for calculating "estimated answer delay" data. As noted above, this routine is used where call statistics are available from one or more of the call centers. The estimate answer delay data may also be used by one or more rules (as a condition). The routine begins at step 44 by computing an expected total call routing percentage for each destination that is proportional to the number of agents at each destination. The number of agents can be obtained from status data. Planning data may be used when status data is unavailable for one or more destinations. In the case where the application does not have control over all calls routed to the destination, the routine continues at step 46 by estimating the number of so-called "invisible" calls routed to each destination since the last call queue length update from that destination. This number is equal to [(total number of calls routed to all destinations since the last update) divided by (fraction of total calls the application has control of)] multiplied by (expected total call routing percentage for the destination).

The routine continues at step 48 to estimate the number of calls finished and the number of calls abandoned since the last status update, using statistics on average call handle times and average call abandon times obtained from status data or from network configuration information. At step 50, the routine calculates the expected current call queue length as [(queue length at last status update) plus (calls routed to destination since last status update) plus (estimated invisible calls routed to destination) minus (estimated calls finished or abandoned since last status update)]. As step 52, the routine then calculates the expected answer delay as (expected current queue length) times (average call handle time) divided by (number of agents currently busy). If planning data indicates that the number of agents logged in will rise or diminish during the next (expected delay) seconds, the routine continues at step 54 and re-calculates the expected delay using a blended value for the number of agents handling calls. The routine then terminates.

The decision procedure according to the invention thus uses status data and planning data in novel ways, resulting in call routing that, compared to prior art, is more robust in case of data outages (such as missing status data from one or more destinations), is able to function more effectively when only part of a total call stream is available for control by the procedure, is better able to anticipate changes in staffing and to distribute load in anticipation of those changes, and is better able to function in situations where some destinations do not have systems capable of providing all of the status data usually needed.

According to another feature of the invention, rules allow data from "cooperating" applications to be used in evaluating conditions. Users can pre-define what the cooperating applications are, and what data items those applications can supply. To ensure acceptable real-time performance, a cooperating application is queried at most once per call being routed. A query is dispatched to the application the first time it is references in a rule condition; the application's response is saved in case subsequent rules need the data.

As noted above, rules are executed until all candidate destinations except one have been eliminated or until all rules have been processed. The specification of complex routing procedures using rules having the effect of eliminating one or more destinations from those eligible to handle the call or adding/subtracting timing or target percentage "bias" values is quite powerful and offers significant advantages over the prior art. Although each rule can access complex condition information, it has heretofore not been known to express complex routing algorithms by such rules. As will be seen below, the expression of complex routing algorithms by rules having these effects allows a simple, linear flow of control that avoids most kinds of programming errors in establishing call plans.

By way of example, the following description compares prior art routing techniques with those of the present invention. In this example it is assumed that real-time feedback from call destinations is not available. Thus routing decisions are based on predetermined routing percentage targets rather than on estimated call answer delay times.

Consider a company having a sales and service group that customers reach by calling an 800 number. The call centers and incoming call traffic have the following characteristics:

The company has call centers in Seattle, Denver, Chicago, and Boston. The agents working at any given time are evenly divided among the call centers open at that time.

Chicago is open 24 hours a day, seven days a week. The other centers are open from 6:00 a.m. to 6:00 p.m. (local time) Monday through Friday, and from 10:00 to 3:00 Saturday.

Total call traffic from the Eastern and Pacific time zones is twice that in the Central and Mountain time zones.

From any given time zone, peak traffic comes between 9:00 and 10:00 a.m. (local time), and between 4:00 and 5:00 p.m.

Minimum traffic comes from 8:00 p.m. to 6:00 a.m., and is 10% of the peak traffic value. Traffic builds steadily from 6:00 a.m. to 9:00 a.m., and drops off steadily from 5:00 p.m. to 8:00 p.m.

From 10:00 a.m. to 4:00 p.m., traffic is a steady 80% of peak value.

Sunday traffic is at the 10% level all day.

Saturday traffic is at 50% of peak levels from 10:00 to 3:00, and 10% at other times.

As can be seen, for purposes of this example the call traffic and staffing patterns are unrealistically well-behaved; more realistic assumptions would make the advantages of the present invention even greater.

Assume further that the call routing has the following objectives:

1. Achieve an approximate balance in the call volume being offered to each open call center in any given time period.
2. To the extent possible after load balancing considerations, it is preferred to serve calls from a given time zone at the call center in that time zone. If that call center is not available, it is preferred to use the closest time zone available.

Such load balancing and geographic routing goals are typical of real-world considerations, although the example has been simplified as much as possible. The load balancing goal provides more consistent service to callers and more efficient use of staff; the geographic routing goal reduces call transport costs. Prior art systems for routing 800-type calls make use of decision trees, routing tables, or equivalent methods to encode decision procedures based on characteristics of the incoming call. Because these methods do not have a built-in load balancing mechanism or a built-in notion of destination capacity, the user must explicitly take load balancing into account in creating a routing plan. If it is desired to adjust call distribution every hour, the decision procedure using prior art techniques requires approximately 200 decision tree nodes or route table entries. An example of a such a prior art routing plan that would best meet the example call routing requirements is set forth below in pseudocode. The code could be converted to a decision tree or routing table form in a straightforward way. In the example plan it is assumed that the call routing processor is located in the Central time zone so all time references are Central time:

```
If today is Sunday
    Send 100% of calls to Chicago
If today is Saturday
    If time is between 00:00 and 09:00
        Send 100% of calls to Chicago
    If time is between 09:00 and 10:00
        For calls from Eastern time zone
            Send 30% to Chicago
            Send 70% to Boston
        For calls from Central, Mountain or Pacific
            Send 100% to Chicago
    If time is between 10:00 and 11:00
        For calls from Eastern time zone
            Send 10% to Chicago
            Send 90% to Boston
        For calls from Central, Mountain or Pacific
            Send 100% to Chicago
    If time is between 11:00 and 12:00
        For calls from Eastern
            Send 74% to Boston
            Send 23% to Chicago
            Send 3% to Denver
        For calls from Central
            Send 100% to Chicago
        For calls from Mountain or Pacific
            Send 100% to Denver
    If time is between 12:00 and 14:00
        For calls from Eastern
            Send 25% to Chicago
            Send 75% to Boston
        For calls from Central
            Send 100% to Chicago
        For calls from Mountain
            Send 100% to Denver
        For calls from Pacific
            Send 25% to Denver
            Send 75% to Seattle
    If time is between 14:00 and 15:00
        For calls from Pacific
            Send 74% to Seattle
            Send 23% to Denver
            Send 3% to Chicago
        For calls from Mountain
            Send 100% to Denver
        For calls from Central or Eastern
            Send 100% to Chicago
    If time is between 15:00 and 16:00
        For calls from Eastern or Central
            Send 100% to Chicago
        For calls from Mountain
            Send 100% to Denver
        For calls from Pacific
            Send 60% to Seattle
            Send 30% to Chicago
            Send 10% to Denver
    If time is between 16:00 and 17:00
        For calls from Eastern, Central or Mountain
```

Send 100% to Chicago
        For calls from Pacific
            Send 30% to Chicago
            Send 70% to Seattle
        If time is between 17:00 and 24:00
            Send 100% to Chicago
If today is Monday through Friday
    If time is between 00:00 and 05:00
        Send 100% to Chicago
    If time is between 05:00 and 06:00
        For calls from Eastern
            Send 19% to Chicago
            Send 81% to Boston
        For calls from Central, Mountain or Pacific
            Send 100% to Chicago
    If time is between 06:00 and 07:00
        For calls from Eastern
            Send 22% to Chicago
            Send 78% to Boston
        For calls from Central, Mountain or Pacific
            Send 100% to Chicago
    If time is between 07:00 and 08:00
        For calls from Eastern
            Send 44% to Boston
            Send 21% to Chicago
            Send 35% to Denver
        For calls from Central
            Send 100% to Chicago
        For calls from Mountain or Pacific
            Send 100% to Denver
    If time is between 08:00 and 09:00
        For calls from Eastern
            Send 50% to Boston
            Send 11% to Chicago
            Send 22% to Denver
            Send 17% to Seattle
        For calls from Central
            Send 100% to Chicago
        For calls from Mountain
            Send 100% to Denver
        For calls from Pacific
            Send 100% to Seattle
    If time is between 09:00 and 10:00
        For calls from Eastern
            Send 70% to Boston
            Send 7% to Chicago
            Send 22% to Denver
            Send 1% to Seattle
        For calls from Central
            Send 100% to Chicago
        For calls from Mountain
            Send 100% to Denver
        For calls from Pacific
            Send 100% to Seattle
    If time is between 10:00 and 11:00
        For calls from Eastern
            Send 78% to Boston
            Send 22% to Chicago
        For calls from Central
            Send 100% to Chicago
        For calls from Mountain
            Send 100% to Denver
        For calls from Pacific
            Send 80% to Seattle
            Send 15% to Denver
            Send 5% to Chicago
    If time is between 11:00 and 12:00
        For calls from Eastern
            Send 81% to Boston
            Send 19% to Chicago
        For calls from Central
            Send 100% to Chicago
        For calls from Mountain
            Send 100% to Denver
        For calls from Pacific
            Send 65% to Seattle
            Send 25% to Denver
            Send 10% to Chicago
    If time is between 12:00 and 15:00
        For calls from Eastern
            Send 75% to Boston
            Send 25% to Chicago
        For calls from Central
            Send 100% to Chicago
        For calls from Mountain
            Send 100% to Denver
        For calls from Pacific
            Send 75% to Seattle
            Send 22% to Denver
    If time is between 15:00 and 16:00
        For calls from Pacific
            Send 81% to Seattle
            send 19% to Denver
        For calls from Central
            Send 100% to Chicago
        For calls from Mountain
            Send 100% to Denver
        For calls from Eastern
            Send 65% to Boston
            Send 25% to Chicago
            Send 10% to Denver
    If time is between 16:00 and 17:00
        For calls from Pacific
            Send 78% to Seattle
            Send 22% to Denver
        For calls from Mountain
            Send 100% to Denver
        For calls from Central
            Send 100% to Chicago
        For calls from Eastern
            Send 80% to Boston
            Send 15% to Chicago
            Send 5% to Denver
    If time is between 17:00 and 18:00
        For calls from Eastern
            Send 66% to Chicago
            Send 34% to Denver
        For calls from Central
            Send 100% to Chicago
        For calls from Mountain
            Send 100% to Denver
        For calls from Pacific
            Send 93% to Seattle
            Send 7% to Denver
    If time is between 18:00 and 19:00
        For calls from Eastern
            Send 100% to Chicago
        For calls from Central
            Send 100% to Chicago
        For calls from Mountain
            Send 100% to Denver
        For calls from Pacific
            Send 66% to Seattle
            Send 28% to Denver Send 6% to Chicago
If time is between 19:00 and 20:00
    For calls from Eastern, Central or Mountain
        Send 100% to Chicago
    For calls from Pacific
        Send 84% to Seattle
        Send 16% to Chicago
If time is between 20:00 and 2400
    Send 100% to Chicago As can be seen, the prior art routing plan is quite lengthy and complex. The present invention takes a simpler, more comprehensive, and more effective approach to meeting the routing requirements. For each destination, regardless of how many 800 numbers might be routed to that destination, the user specifies the expected call handling capacity at that destination for each hour of the day. This capacity generally is directly related to the number of agents staffing the call center, and the definition of destination capacities could easily be a by-product of automated agent scheduling software. Once the capacity data for the four call centers is available, the following constitutes the complete routing plan for the example situation (the keyword "ANI" refers to calling number identification):

If ANI is from Eastern, prefer Boston by 3%, prefer Chicago by 2%, and prefer Denver by 1%.

If ANI is from Central, prefer Chicago by 2%, prefer Boston by 1%, and prefer Denver by 1%.

If ANI is from Mountain, prefer Denver by 2%, prefer Chicago by 1%, and prefer Seattle by 1%.

If ANI is from Pacific, prefer Seattle by 3%, prefer Denver by 2%, and prefer Chicago by 1%.

The above four rules express the geographic routing preferences; there is no need to encode the load balancing requirements into rules because they are an implicit part of the call routing procedure.

Clearly, in this example the routing plan for the prior art solution is much more time-consuming to create and much more difficult to verify as correct by inspection. If it is desired to adjust the load every 15 minutes instead of every hour, the prior art routing plan would become several times as large, whereas the present invention plan would not be affected. Likewise, if the call distributions were not identical on every weekday as assumed in the example, the prior art routing plan would become several times as large, whereas the present invention plan again would not be affected. If the call distributions had a more complicated shape than assumed in the example, the prior art routing plan would have been much more difficult to create correctly, whereas the present invention plan would not be affected. If the relative number of calls coming in from each time zone were not exactly as predicted, the prior art routing procedure would distribute the load unevenly, whereas the present invention procedure will adjust automatically. Further, if the call handling capacities at each call center were not exactly as predicted, the adjustment of the prior art routing plan would be quite complex, whereas the adjustment of the capacity tables in the present invention would be straightforward and intuitive. Finally, the compiled version of the prior art routing plan would require much more memory space in a routing processor than would the compiled version of the routing plan made according to the teachings of the invention.

In summary, the present invention allows the creation of routing plans with less effort and more likelihood that the plan is correct. The routing procedure is more robust than the prior art in case of imperfect predictions and in dealing with normal fluctuations in call arrivals. The routing plan may consist essentially of just one or more rules that define geographic and caller segmentation routing goals (i.e., load balancing rules are not needed), and routing is achieved by executing a load balancing algorithm subject to the rules.

Some of the different types of rules that may be useful in a toll-free "800" number routing scheme can now be described. Of course, it should be appreciated that the following description is merely for exemplary purposes to show how the rules-based methodology might be implemented according to the invention. Such a scheme would conventionally be implemented by a company having many call centers, all answering calls made to the same set of 800 numbers. For this discussion, each call center would include an ACD or similar equipment capable of queuing calls and reporting statistics. The company will want to distribute calls to its call centers in a way that will optimally meet its business goals. To this end, one or more rules might be generated (in a prior off-line process) to establishes preferences. Thus, for example, a least-cost routing preference might be implemented with rules such as:

If ANI is from Texas, prefer Dallas or Houston by 10 seconds; or

If ANI is from New Jersey, prefer Newark by 10 seconds.

The following is a rule that might be used for a preference that each call center is responsible for handling its own traffic as long as service level commitments are being achieved:

If ANI is from New Jersey and delay at Newark is less than 20 seconds, select Newark.

Yet other rules may be crafted for a preference limited the workload of newer agents unless absolutely necessary to handle the call volume:

If the delay for Trainees is greater than 10 seconds and the advantage of Trainees over Veterans is less than 20 seconds, select Veterans. The following rule is illustrative of a day and time specification:

If ANI is from Texas, day is Mon-Fri, and time is 9:00 am –5:00 pm, prefer Dallas by 5 seconds.

This rule is responsive to caller-entered digits and avoids having certain preferred customers served by newer agents or trainees:

If CED is a PrefCustomer, penalize Trainees by 10 seconds. As can be seen, the above rules are created using an English-like syntax which is quite easy and reliable to use. The rules provide a straight-line flow of control that is less subject to user errors and more easily verifiable by inspection. They can be used to support a unique degree of cooperation with separately-provided call classification applications. Such a rules-based approach advantageously supports complex routing based on comparative delay times at the destinations, call center service level commitments and other considerations with fewer routing instructions. They also provide more human-understandable and self-documenting routing plans.

The present invention is also useful generally to provide call routing for N00 service offerings, where N is "7" "8" or "9". The invention thus advantageously allows interexchange ("IXC") customers to provide N00 routing services. Generally, in existing N00 routing systems, time of day routing is used either to avoid routing to destinations that are closed or it is used as part of a static load balancing scheme (because of forecast differences in mix of calls by originating location at different times of day). According to the invention, the first of these is handled implicitly by defining the open hours for each destination. The second is generally unnecessary because load balancing is done in a more fundamental way that does not require juggling estimates of call arrival mix. When there is a reason to do time of day routing explicitly, it can be expressed in a rule using natural syntax such as the following:

If ANI is from Texas and time is between 8:00 am and 5:00 pm, select 214-612-2600.

For each N00 number to be routed, there is a list of possible translations and a routing plan that describes constraints and preferences for translations selection. As previously described, the routing plan consists of a list of rules in an English-like syntax. In the simplest case there is exactly one translation in the list for the N00 number; in this case no routing plan rules are needed. Where a decision must be made among multiple possible translations, each representing a different "destination" for the call, the routing plan rules and processing can be used as previously described. Also, the routing technique may be implemented in the case of a customer who has multiple N00 numbers, each possibly homing on a different subset of that customer's over-all list of destinations.

As described above, the load balancing algorithm based on percentage usage (or other load metric) is the cornerstone of the routing decision procedure. Further, by making the percentages a feature of the destination rather than the individual N00 number, the invention greatly simplifies the problem of managing traffic where multiple N00 numbers are involved.

It should be appreciated by those skilled in the art that the specific embodiments disclosed above may be readily utilized as a basis for modifying or designing other structures for carrying out the same purposes of the present invention. Thus, for example, the call routing techniques of the invention are useful where one or more call centers handle multiple 800 numbers, or where other advanced N00 service offerings are or will be implemented in the future. It should also be realized by those skilled in the art that such equivalent constructions do not depart from the spirit and scope of the invention as set forth in the appended claims.

What is claimed is:

1. A method, using a call processor, for selecting which call center among a plurality of call centers in a telephone network is to receive an incoming telephone call, comprising the steps of:

generating a routing plan comprising a set of rules, one or more rules in the set of rules having a conditions portion and an actions portion, the conditions portion of the rule defining one or more call routing conditions and the actions portion defining user selectable destination criteria for biasing an ability of at least one call center relative to the plurality of call centers to be selected to receive the incoming telephone call when the call routing conditions of the rule are met, the user selectable destination criteria including:

(a) when call center answer statistics are available, timing preferences that apply a bias value to an estimated answer delay of the at least one call center of the plurality of call centers to thereby temporally bias the at least one call center relative to one or more call centers of the plurality of call centers;

(b) when call center answer statistics are not available, target routing preferences that apply a bias value to an initial target routing percentage for at least one call center of the plurality of call centers to thereby load bias the target routing percentage of the at least one call center relative to one or more other call centers of the plurality of call centers;

using the set of rules to determine which of the plurality of call centers in the telephone network is to receive the incoming call.

2. The method as described in 1 further includes the step of calculating an estimated answer delay for one or more of the call centers.

3. The method as described in claim 2 wherein the step of using the set of rules includes the step of selecting the call center having the shortest estimated answer delay after the estimated answer delay for the at least one call center has been biased as directed by the routing plan rules.

4. The method as described in 1 wherein the step of using the set of rules includes the step of selecting the call center having a smallest number of recently routed calls as compared to initial target percentages after the initial target percentages for the at least one call center have been biased as directed by the routing plan rules.

5. The method as described as claim 1 wherein the user selectable destination criteria further include one or more constraints that eliminate call centers from the plurality of call centers that may receive the incoming telephone call.

6. A method, using a call processor, for selecting which call center among a plurality of call centers in a telephone network is to receive an incoming telephone call, wherein the call centers provide call center answer statistics to the call processor, comprising the steps of:

generating a routing plan comprising a set of rules, one or more rules in the set of rules having a conditions portion and an actions portion, the conditions portion of the rule defining one or more routing conditions and the actions portion of the rule defining user selectable criteria for biasing an ability of at least one call center relative to the plurality of call centers to be selected to receive the incoming telephone call when the call routing conditions of the rules are met, the user selectable criteria including timing preferences that apply to a bias value to an estimated answer delay of the at least one call center of the plurality of call centers to thereby temporally bias the at least one call center relative to one or more call centers of the plurality of call centers; and using the set of rules to route the incoming call to the call center having a smallest answer delay based on the temporal biasing.

7. The method as described in claim 6 wherein the selectable destination criteria further includes one or more constraints that eliminate call centers from the plurality of call centers that may receive the incoming telephone call.

* * * * *